Sept. 6, 1932.  E. J. GRAY ET AL  1,876,410
INDUSTRIAL TRUCK
Filed March 16, 1929   5 Sheets-Sheet 1

Sept. 6, 1932.  E. J. GRAY ET AL  1,876,410
INDUSTRIAL TRUCK
Filed March 16, 1929  5 Sheets-Sheet 4

Inventors:
Elmer J. Gray
Ernesto J. Hoyos
By Macleod, Calver, Copeland & Dike
K4 Attorneys.

Sept. 6, 1932.  E. J. GRAY ET AL  1,876,410
INDUSTRIAL TRUCK
Filed March 16, 1929   5 Sheets-Sheet 5

Patented Sept. 6, 1932

1,876,410

UNITED STATES PATENT OFFICE

ELMER J. GRAY AND ERNESTO J. HOYOS, OF BOSTON, MASSACHUSETTS, ASSIGNORS TO ROBERT T. ROMINE, OF MOUNT CLEMENS, MICHIGAN

INDUSTRIAL TRUCK

Application filed March 16, 1929. Serial No. 347,585.

This invention relates to power driven industrial trucks of the type characterized not only by its relatively low platform, such as a lift platform, but by the concentration of the greater portion of the load on relatively small wide tread load wheels disposed beneath the platform. Trucks of this type are characterized by the arrangement of the main part of the frame in the rear of the platform, which is supported usually by large dirigible driving wheels and which part of the frame commonly carries the motor and battery, the operator having a platform to stand on at the rear of the battery housing where he is within reach of the various controls. This kind of truck is of a distinct type in the art, and is usually provided with an elevating or a lift platform, as in the present case, with mechanism for lifting the platform either a few inches or to a substantial height above the load supporting frame extension, and with a separate electric motor for operating the platform lifting mechanism.

The present invention embodies certain improvements in this type of truck, and an object of the invention is to provide an improved power driven industrial truck in which the longitudinally spaced small load wheels, situated beneath the load platform, are supported for vertical articulation in an improved manner whereby efficiency and economy in operation may be obtained.

Other objects of this invention will appear in the following description and appended claims, reference being had to the accompanying drawings forming a part of this specification, wherein like reference characters designate corresponding parts in the several views.

Before expaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Figure 2:
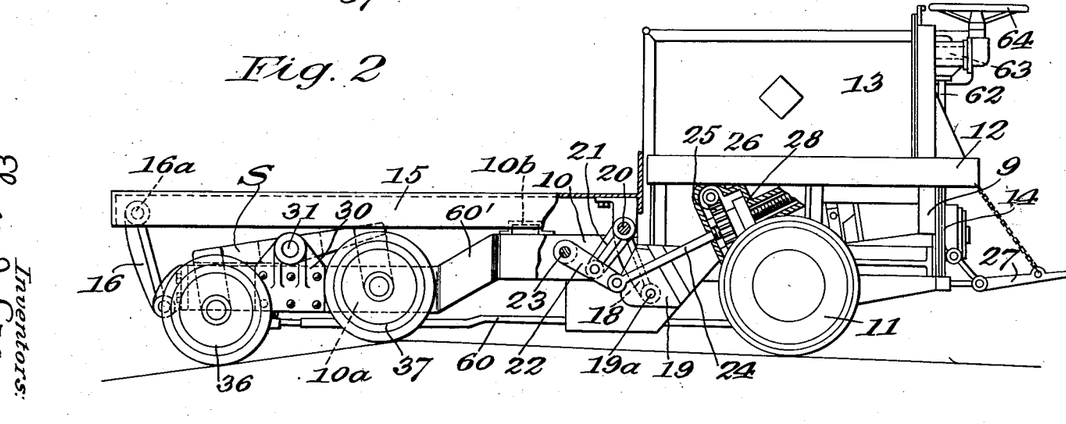
Fig. 2 is a similar view, partly broken away and in section, illustrating the platform in raised position.
Figure 3:
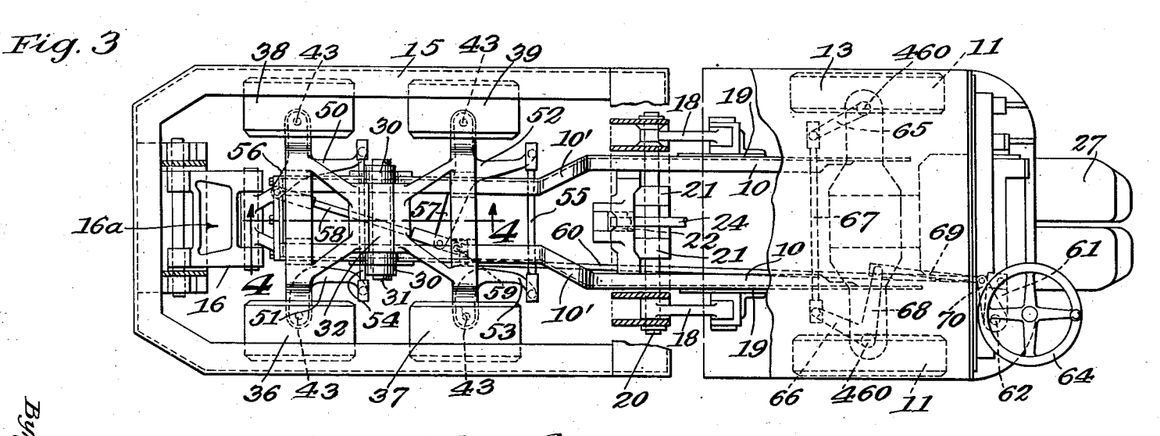
Fig. 3 is a fragmentary plan view of the truck.
Figure 4:
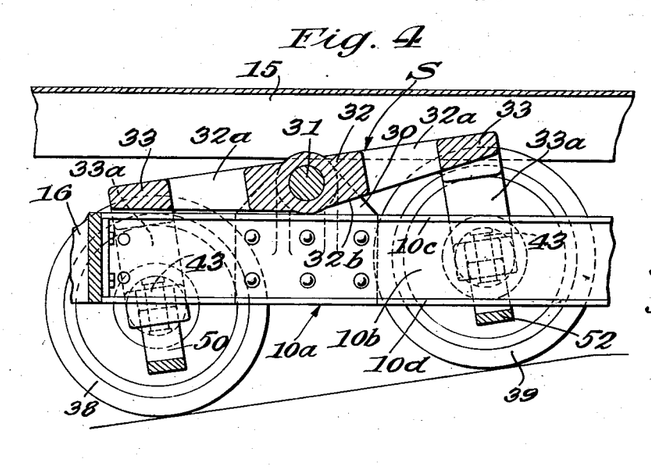
Fig. 4 is a fragmentary longitudinal section taken substantially on line 4—4 of Fig. 3 in the direction of the arrows.

In the drawings I have illustrated a power driven truck of the lift or elevating platform type embodying the invention, this truck comprising a relatively low chassis or main frame 9. The rear end of this main frame preferably supports the various operating mechanisms including battery and motors, and the frame has a forward extension 10 in the form of spaced parallel sills preferably composed of structural steel bars which form the load supporting frame portion which is disposed relatively close to the ground. The truck is provided at its rear end with a pair of driving wheels 11 mounted on the chassis and supporting the rear main portion of the frame. Extending upwardly from the rear end of the chassis 9 is a suitable frame structure 12 forming a platform support for a housing or casing 13 within which are carried the batteries for the electric motor or motors. In the present instance a motor 14 is supported beneath the battery housing 13 and is connected by suitable mechanism to the driving wheels 11 for the purpose of driving the same. A load elevating platform 15 extends forwardly from the frame structure 12 and surmounts the forward frame extension. This platform is pivotally attached to the frame extension at its forward end and supported therefrom by means of a link frame 16, such as by pins and brackets indicated at 16a in Figs. 3 and 6. The rear end of the load elevating platform 15 is in the present instance connected with the frame as well as to a motor 17 by means of a toggle mechanism. As shown in Figs. 2 and 3 this toggle mechanism may include a pair of links 18 attached at their lower ends to plates 19 by means of pivot pins 19a. The plates are attached to the side bars of the chassis 10 and depend therefrom. The upper ends of the links 18 are pivotally connected to the elevating platform 15 by means of a transverse bar 20 which is secured to suitable brackets depending from the underside of the platform. Located intermediate the chassis sills is a second link frame 21 connected at its upper end by means of the pivot bar 20 to the platform and at its lower end pivoted to a link frame 22 intermediate the ends of the latter. The link frame 22 is pivoted at one end thereof to the chassis side bars by a transverse bar 23, and at its opposite end is pivotally attached to a threaded rod or ram 24.

Mounted on the ram 24 is a worm gear 25, the hub of which comprises a nut engaging the threads formed on the ram. The worm gear 25 is driven by a worm 26 and the latter is mounted on the shaft of the electric motor 17, which is electrically connected to the battery within the housing 13.

Figure 1:
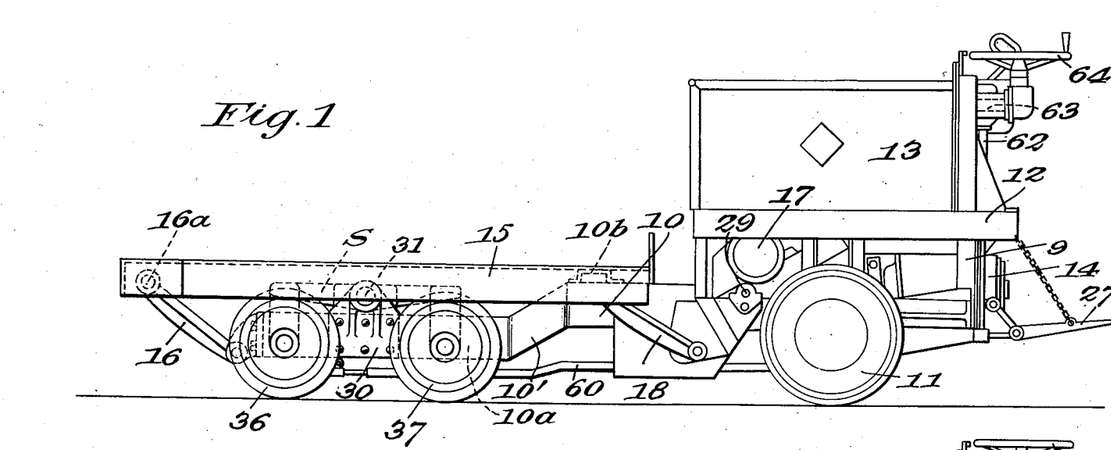
Fig. 1 is a side elevation of a truck embodying the invention and illustrating the lift platform in lowered position.

When the rod or ram 24 is retracted or drawn upwardly to operate the toggle mechanism, the lift platform 15 is raised from the position shown in Fig. 1 to the position shown in Fig. 2. The motor 17, worm gear 25, etc. are mounted in a casing 28 which may be pivotally mounted at 29 (see Fig. 1) to permit the ram 24 to swing.

Figure 5:
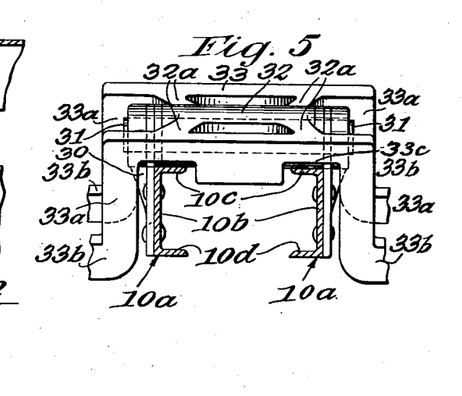
Fig. 5 is a fragmentary detail view illustrating the rocking sub-frame in this form of the invention.

As illustrated in Figs. 1 to 3 inclusive the load supporting frame portion 10 may comprise a pair of spaced parallel sills which as they extend forwardly converge or taper inwardly as shown in Fig. 3 and at the same time are offset downwardly at 10′ as shown in Figs. 1 and 2. This offset may be located at any desired point in the length of the main frame. These sills are preferably formed from structural channel bars, and it will be seen that the forward portions 10a of the sills extend relatively close together and in parallelism. If desired the sills may be united or formed in a single piece where they extend between the load supporting wheels. Referring more particularly to Fig. 5 it will be seen that the sill extensions 10a in advance of the offsets and converging portions 10′ each preferably comprises a vertical web 10b having upper and lower inwardly extending horizontal flanges 10c and 10d. It will be noted that the frame extension is so constructed, as by means of the offset portion 10′, so as to provide a space between it and the bottom of the platform 15 when in lowest position for a rocking sub-frame S. This sub-frame in this form of the invention is mounted to rock between the platform 15 and frame extension or sills 10a. The sub-frame is mounted on the sills by means of a pair of brackets 30 riveted to the outer faces of the sill webs 10b. The brackets preferably extend above the tops of the sills and mounted therein is a transverse fixed shaft 31 forming the axis of rocking for the sub-frame S. This sub-frame may comprise a central part, designed in the form of a spider and having a sleeve or hub member 32 and diverging arms 32a joined thereto. Connected to the opposite ends of the arms 32a are a pair of transverse axle members 33, one at the front and one at the rear of the pivot 31. Each of these axle members in the present instance is offset downwardly at 33a at each end and at the lower part of this offset is provided with a projecting axle portion or knuckle carrying portion 33b which extends into the load wheel drum. To provide for a maximum rocking movement beneath the platform the sub-frame may be cut away to form recesses 33c. Moreover the under surfaces of the sub-frame at 32b may be shaped to form stops adapted to engage the sills so as to limit the rocking movement of the sub-frame. It will also be noted that the sub-frame in this form of the invention is capable of rocking to a point substantially higher than the load wheels, and is mounted to extend above the tops of the load wheels. Accordingly stops 10b′ (Fig. 1) are mounted on the frame sills 10 so as to limit downward movement of the platform and enable the sub-frame to rock without engaging the bottom of the platform when down.

Figure 6:
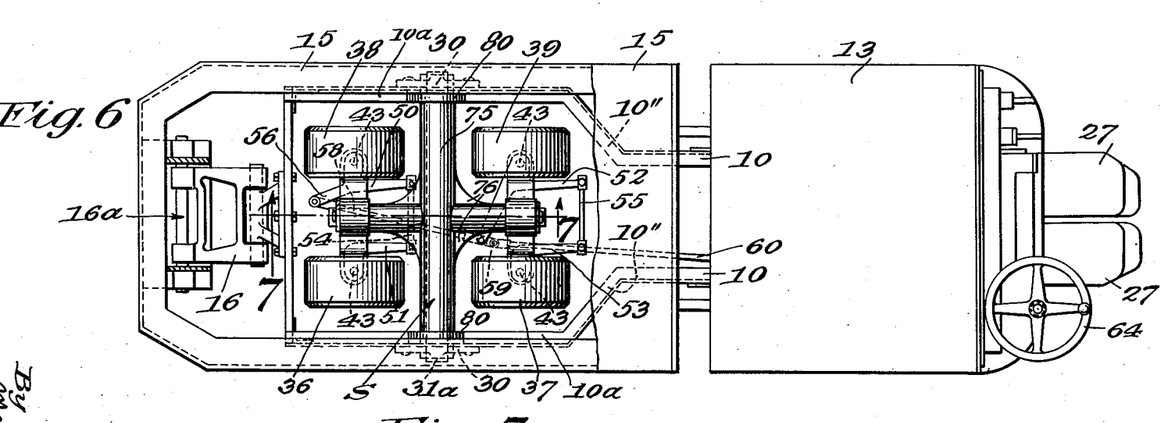
Fig. 6 is a plan view, with the platform broken away, illustrating the truck embodying another form of the invention.
Figure 8:
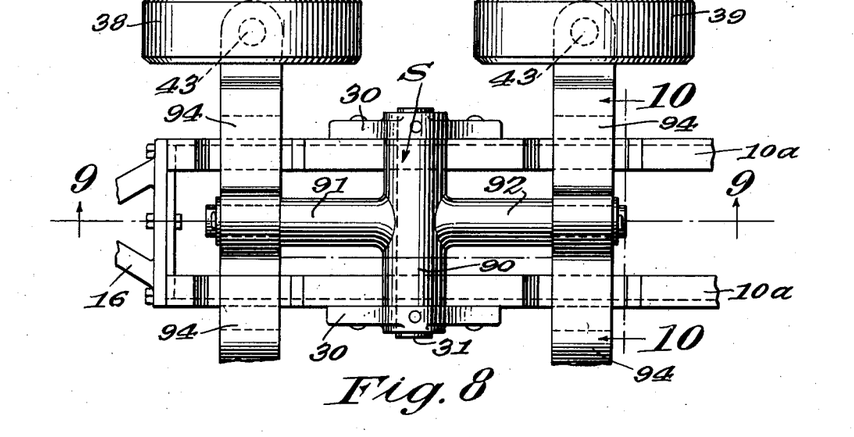
Fig. 8 is a fragmentary plan view illustrating a rocking sub-frame built in accordance with another form of the invention.
Figure 11:
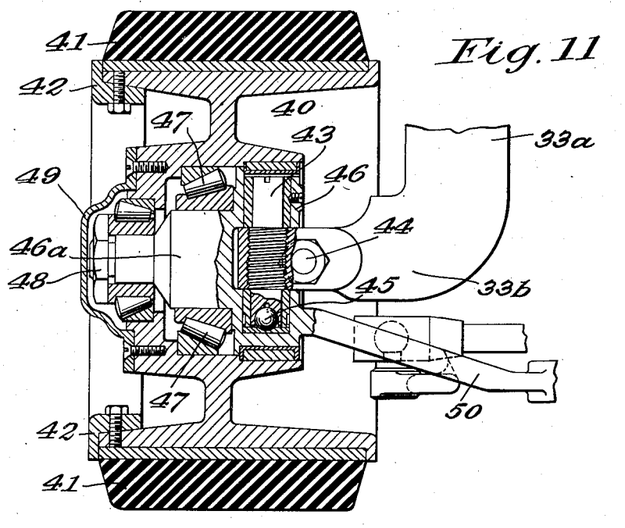
Fig. 11 is a detail sectional view illustrating a wheel mounting.

Mounted beneath the load elevating platform 15 are a number of load carrying wheels 36, 37, 38 and 39 of relatively small diameter and each having a relatively wide bearing surface or tread. These load wheels may be of the single wide tread type, as shown in Figs. 3, 6 and 11 or of the dual tread type as shown in Fig. 8, depending upon the load capacity of the truck. Each rocking sub-frame S carries at opposite ends a pair of load wheels, each load wheel being mounted on a steering knuckle carried by the projecting axle portion of a transverse axle member 33, 79 or 94. As illustrated in Fig. 11, each load wheel may comprise a hollow steel shell or drum 40 carrying a relatively wide tire tread 41 mounted on a removable rim held in place by means of a ring 42 bolted to the drum. Where dual treads are employed the wheel construction is substantially the same with the exception that the treads are preferably independently rotatable upon the periphery of the drum 40.

Referring more particularly to Figs. 3 and 11, each load wheel 36, 37, 38 and 39 is mounted on a knuckle carried at the end of one of the axle portions, in this instance the axle portion 33b. The outer end of this axle portion may be tapped to provide a vertical hole through which is threaded a pivot pin 43. This pin is rigidly fixed within the tapped hole in the split end of the part 33b by means of a bolt or nut 44 which clamps the split end portions of the part 33b together on to the pin 43. This pin rests upon a ball bearing 45 supported by a knuckle sleeve 46, the latter being free to turn about the axis of the pin 43. The drum 40 is provided with a central hub mounted on the knuckle and between the axle portion 46a of the knuckle and this hub are interposed suitable tapered roller bearings 47. These parts may all be held in position by means of a nut 48. To the outer face of the hub is secured by means of suitable screws a cap 49. To the knuckle 46 of each of the load carrying wheels is secured below the end of the axle portion 33b one of the steering arms, 50, 51, 52, 53, hereinafter described. From this construction it will be seen that each load wheel may be turned while steering the truck about the fixed vertical axis of the pin 43 and each wheel is free to revolve on the projecting axle portion 46a of the knuckle. It will also be noted that each knuckle with the steering arm is located or projects interiorly of the drum 40 so that the axis of turning 43 is situated preferably close to the central vertical axis of the drum passing through the centre of gravity thereof.

Mounted on the knuckles 46 is a steering arm 50 for the wheel 38 and a steering arm 51 for the wheel 36. A steering arm 52 is mounted on the knuckle for the wheel 39 and a steering arm 53 is correspondingly provided for the wheel 37. The steering arms 50 and 51 are flexibly connected by means of a transverse rod 54 and the steering arms 52 and 53 are flexibly connected by a transverse rod 55. The steering arm 50 is provided with an offset arm portion 56 and the steering arm 52 is provided with an offset arm portion 57, these offset portions being pivotally joined together by means of a connecting rod 58.

The rod 58 is flexibly connected to a rearwardly extending rod 60 as by means of a ball joint 59. This rod terminates adjacent the rear or driving end of the truck and is suitably connected to an arm 61 mounted adjacent the lower end of a vertically extending steering post 62. The steering post 62 at its upper end is connected to a horizontally extending stud shaft 63 (see Fig. 1) and this shaft is operated through the medium of reduction gearing (not shown) by means of a steering wheel 64.

The rear driving wheels 11 are also mounted on steering knuckles 460 so as to turn relative to the chassis frame. Connected to the axle spindles of the driving wheels 11 are steering arms 65 and 66, which are flexibly connected together by means of a transverse rod or link 67. The arm 66 is provided with an offset portion 68 which is connected to the steering post 62 by means of a link 69 and an arm 70 which are flexibly connected together.

Figure 12:
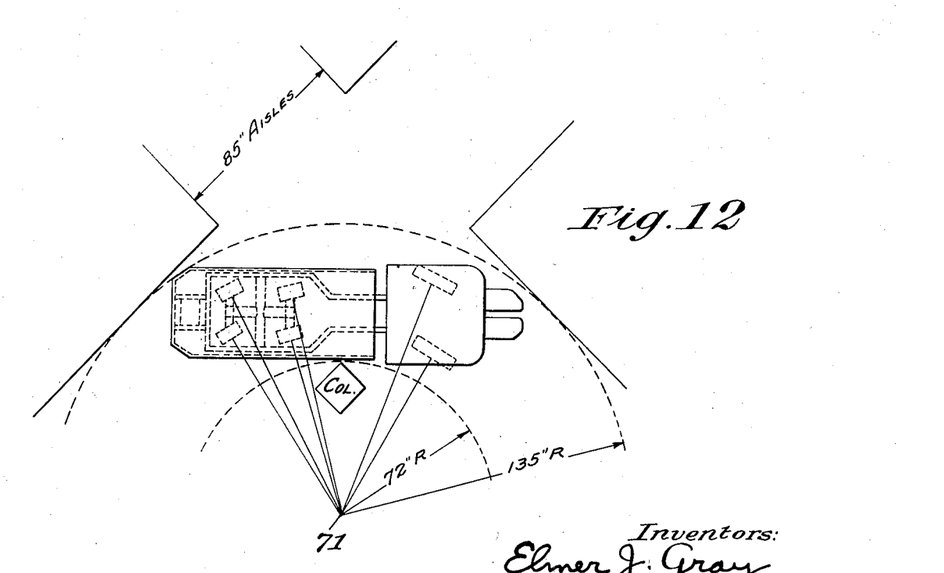
Fig. 12 is a diagrammatical plan view showing the steering of the truck.

The steering arms and connecting rods or links of the load wheels and the driving wheels either in the construction shown in Fig. 3 or the constructions shown in Figs. 6 and 8, are substantially the same with the exception that these parts are designed of proper lengths and are properly proportioned so that the steering mechanism may be operated to cause all of the wheels to turn simultaneously about substantially a common turning centre or locus 71 (see Fig. 12). The turning centre 71 lies at all times in a line extending at right angles to the central longitudinal axis of the truck intermediate the normal axes of the front or driving wheels 11 and the intermediate set of wheels 37 and 39, and as a result of this construction an extremely short turning radius may be obtained as shown in Fig. 12.

Figure 7:
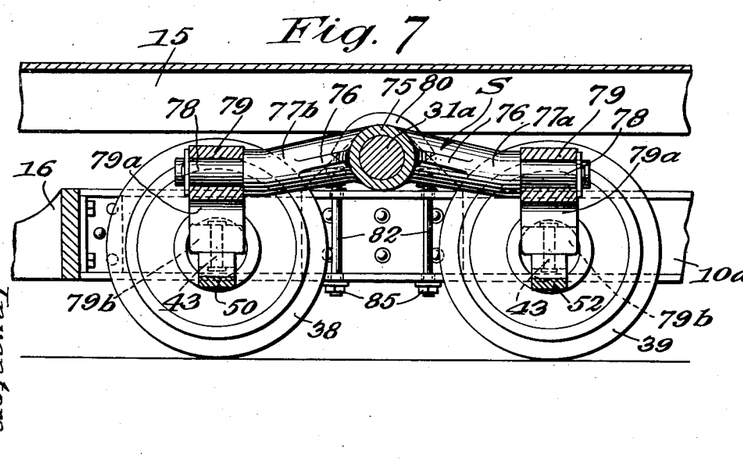
Fig. 7 is a fragmentary longitudinal section taken substantially on line 7—7 of Fig. 6 in the direction of the arrows.

Referring now to Figs. 6 and 7, it will be seen that the sills 10 in this instance diverge outwardly and are offset downwardly at 10″ preferably at a point in advance of the upright housing 13 and in rear of the pairs of load wheels. Beyond the offset portions 10″ the sills extend in parallel relation at 10a adjacent the outer longitudinal edges of the lift platform 15. This construction provides a space between the sills for the rocking sub-frame S and the longitudinally and laterally spaced pairs of load wheels 36, 37, 38 and 39. As above described the sub-frame S is mounted on the sills 10a by means of a pair of brackets 30 which project above the sills and support a transverse shaft 31a. The sub-frame in this form of the invention comprises a sleeve or hub portion 75 and longitudinally extending arms 77a and 77b joined to the hub portion 75 by means of stiffening webs 76. The central or intermediate portion of the sub-frame thus comprises parts 75, 76, 77a and 77b; and pivotally joined to opposite ends of the arms 77a and 77b are transverse axle members 79 which are substantially shorter than the hub portion 75 and shaft 31a, and are constructed so as to permit each load wheel to turn freely for steering purposes between the longitudinal arms 77a, 77b and the sills 10a. The ends of the arms 77a and 77b are turned down to provide alined journals 78 upon which the axle members 79 are mounted to rock on a common longitudinal axis. Each axle member 79 at each end thereof has a downward extension 79a (similar to the extension 33a in Fig. 5) and also an outwardly projecting axle portion 79b (similar to axle portion 33b). The axle portions 79b project into the load wheel drums (see Fig. 11) and are connected to pivots 43 and knuckles 46 whereby each load wheel is dirigible. The steering mechanism for these load wheels in the construction shown in Figs. 6 and 7 is the same as that described above with the exception that the links and arms are differently proportioned in accordance with the location of the load wheels 36 and 37 somewhat closer to the wheels 38 and 39.

Figure 7A:
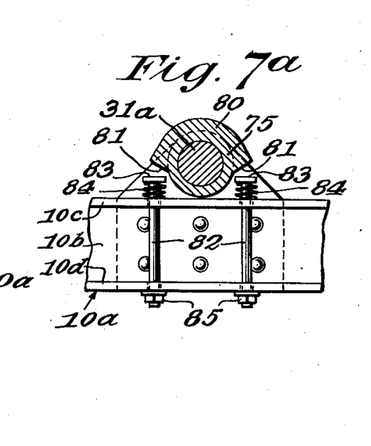
Fig. 7a is a detail of the stop mechanism for the sub-frame.

Referring to Fig. 7a it will be seen that the sub-frame and frame extension 10a are provided with cooperating means whereby the rocking movement of the sub-frame about the axis of the shaft 31a may be limited so as to provide a predetermined range of rocking movement beneath the platform while preventing the axle members 79 from striking the bottom of the platform 15. In the present instance, the sleeve or hub portion 75 of the sub-frame S is provided at each end with a projecting segment 80 having at opposite ends stop faces 81 terminating at the proper angle to provide the proper range of rocking movement of the sub-frame. Beneath each of the stop faces 81 the frame bar 10a is drilled vertically through the flanges 10c and 10d to provide a pair of alined holes to receive a sliding plunger 82. Between the upper head 83 of this plunger and the flange 10c is located a compression spring 84. Each plunger is held in place at its lower end by means of a collar and nut 85. From this construction it will be seen that rocking movement of the sub-frame will be limited in either direction by means of the stop faces 81 cooperating with the plungers, this action being cushioned by means of the springs or other suitable cushioning means.

Figure 9:
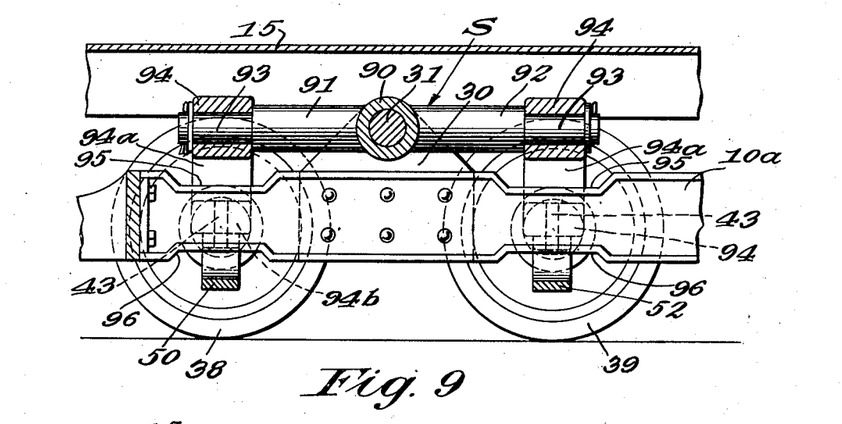
Fig. 9 is a longitudinal section taken substantially on line 9—9 of Fig. 8, in the direction of the arrows.
Figure 10:
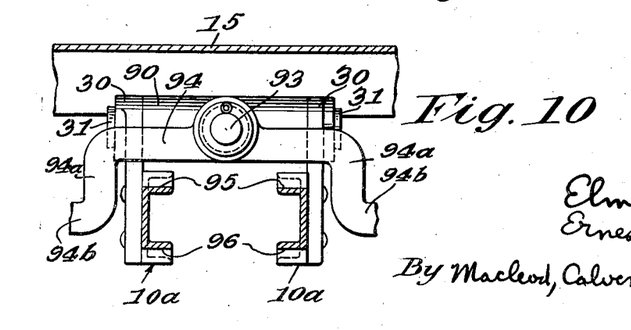
Fig. 10 is a fragmentary transverse section taken substantially on line 10—10 of Fig. 9 in the direction of the arrows.

In the construction shown in Figs. 8, 9 and 10 the frame sills 10, in front of the upright housing 13 and in rear of the pairs of load wheels, diverge inwardly and downwardly in the same manner as illustrated in Figs. 1, 2 and 3. In this instance the sub-frame S is supported in like manner on the sills 10a by means of upwardly projecting brackets 30 riveted to the sills, these brackets carrying the fixed shaft 31. Mounted to rock on this shaft about the axis thereof is the sub-frame S. The central intermediate portion of this sub-frame in this instance comprises a sleeve or hub 90 and oppositely extending longitudinal arms 91 and 92 which are turned down at their ends to provide journals 93. Pivotally mounted on the journal ends 93 are axle members 94 which are adapted to rock about a common longitudinal axis through the journals 93. The axle members 94 each extend above and beyond opposite sides of the sills 10a and are provided at each end with a downward extension 94a (similar to the extension 33a) and an outwardly projecting axle portion 94b (similar to the axle portion 33b). The axle portions 94b extend into the interior of the load wheel drums and are attached to steering pivots 43 carrying knuckles 46 (see Fig. 11) which in turn support the load wheels 36, 37, 38 and 39. In this instance the load wheels are of the dual tread type although single tread wheels may be used to suit the load capacity of the truck. From the foregoing it will be seen that the rocking sub-frame S is mounted in the space formed between the sills 10a and the bottom of the platform 15 when in its lowest position illustrated in Fig. 9. The sub-frame may rock vertically about a horizontal transverse axis 31. Moreover each axle member 94 may rock vertically and independently about a common longitudinal axis extending centrally through the arms 91, 92 and the journal ends 93. The sills 10a may be provided with upper recessed portions 95 so as to permit a maximum rocking movement of the axle members 94 between the sills and platform in any position of the latter. This rocking movement is limited by the axle members contacting with the bottoms of the notched or recessed portions 95 so as to prevent the sub-frame from striking the bottom of the platform when down. Moreover, the sills 10a may also be provided with lower notched or recessed portions 96 to receive the steering arms, such as 50 and 52, permitting the latter to articulate vertically with the load wheels without striking the sills. It will be understood that the steering mechanism in the form of the invention shown in Figs. 8 to 10 inclusive is the same as described above.

What we claim is:

1. In an industrial power driven truck, a frame comprising a main portion at the rear end and a forward load supporting frame extension disposed relatively close to the ground, a platform surmounting said extension, said frame extension having a downward offset to provide a space beneath the platform, a sub-frame pivotally connected to the frame extension in front of said offset to rock on a horizontal axis in said space, portions on said sub-frame extending downwardly into the horizontal plane of the frame extension, and dirigible load wheels mounted on said downwardly extending portions to rock toward and from the platform.

2. In an industrial power driven truck, a frame comprising a main portion at the rear end and a forward load supporting extension disposed relatively close to the ground, a platform surmounting said frame extension, a rocking sub-frame, said sub-frame comprising a longitudinally extending central portion pivoted on a transverse axis to said frame extension and transverse axle members pivoted to said central portion to rock on a longitudinal axis between said platform and frame extension, and longitudinally spaced dirigible load supporting wheels of relatively small diameter mounted at the ends of said axle members.

3. In an industrial power driven truck, a frame comprising a main portion at the rear end and a forward load supporting extension disposed relatively close to the ground, a platform surmounting said frame extension, a rocking sub-frame, said sub-frame comprising a longitudinally extending central portion pivoted on a transverse axis to said frame extension and extending between the platform and frame extension, transverse axle members at opposite ends of said central sub-frame portion, depending portions on said transverse axle members extending from a plane substantially above the frame extension into the horizontal plane of the latter, and longitudinally spaced dirigible load supporting wheels of relatively small diameter mounted on said depending portions.

4. In an industrial power driven truck, a frame comprising a main portion at the rear end and a forward load supporting extension disposed relatively close to the ground, a platform surmounting said frame extension, a rocking sub-frame, said sub-frame comprising a longitudinally extending central portion pivoted on a transverse axis to said frame extension and extending between the platform and frame extension, transverse axle members pivotally joined to opposite ends of said central sub-frame portions and mounted to rock independently on a common longitudinal axis, said sub-frame having portions extending downwardly from above the horizontal plane of said frame extension into the plane of the latter to position the axle members below the top surface of the frame extension, and longitudinally spaced dirigible load wheels mounted at the ends of said axle members beneath the platform.

5. In an industrial power driven truck a frame comprising a main portion at one end and a forward load supporting extension disposed adjacent the ground, a lift platform surmounting said frame extension, a rocking sub-frame comprising a longitudinally extending intermediate portion and transverse axle members pivotally joined to opposite ends of said intermediate portion to rock independently on a common longitudinal axis, a transverse shaft carried by the frame extension for pivotally mounting said intermediate portion, stop abutment means between the frame extension and said intermediate portion for limiting the rocking movement of the sub-frame, and longitudinally spaced relatively small diameter dirigible load wheels carried at the end of said axle members beneath the platform.

6. In an industrial power driven truck, a frame comprising a main portion at one end and a forward load supporting extension disposed adjacent the ground and comprising spaced sills, a lift platform surmounting said frame extension, a rocking sub-frame comprising a longitudinally extending intermediate portion and transverse axle members joined to opposite ends of said intermediate portion to rock independently on a common longitudinal axis, a shaft carried by the frame extension for pivotally mounting said intermediate portion, stop abutment means between the frame extension and said intermediate portion for limiting the rocking movement of the sub-frame, and longitudinally spaced relatively small diameter dirigible load wheels carried at the end of said axle members between said sills and beneath the platform.

7. In an industrial power driven truck, a frame comprising a main portion at one end and a forward load supporting extension disposed adjacent the ground, a lift platform surmounting said frame extension, a rocking sub-frame comprising a longitudinally extending intermediate portion and transverse axle members joined to opposite ends of said intermediate portion, means carried by said frame extension for pivotally mounting said intermediate sub-frame portion to extend between the platform and frame extension, said platform in its lowest position and said frame having a space therebetween for housing said sub-frame to permit rocking movement thereof, means for limiting the rocking movement of the sub-frame beneath the platform, and longitudinally spaced dirigible load wheels carried at the ends of said axle members beneath the platform.

8. In an industrial truck, a frame comprising a main portion at the rear end and a forward load supporting frame extension extending relatively close to the ground, a platform surmounting said extension, a sub-frame member disposed between said platform and frame extension and mounted on a transverse axis for rocking movement between the platform and frame extension, said sub-frame member having portions extending downwardly from above said frame extension into the horizontal plane of the latter, and longitudinally spaced, relatively small diameter load wheels carried by said downwardly extending portions of said sub-frame member whereby to articulate vertically beneath said platform.

In testimony whereof we affix our signatures.

ELMER J. GRAY.
ERNESTO J. HOYOS.